US011992158B2

(12) United States Patent
Oilmaghani et al.

(10) Patent No.: US 11,992,158 B2
(45) Date of Patent: May 28, 2024

(54) AUTOMATED METHOD AND SYSTEM FOR PROCESSING A DESIRED DOSE OF PARTICLES FROM A PARTICLE STORAGE CONTAINER

(71) Applicants: Sahand Oilmaghani, Brooklyn, NY (US); Juhi Kalra, San Francisco, CA (US); Perry Anderson, Kensington, CA (US); Cris Pavloff, San Francisco, CA (US)

(72) Inventors: Sahand Oilmaghani, Brooklyn, NY (US); Juhi Kalra, San Francisco, CA (US); Perry Anderson, Kensington, CA (US); Cris Pavloff, San Francisco, CA (US)

( * ) Notice: Subject to any disclaimer, the term of this patent is extended or adjusted under 35 U.S.C. 154(b) by 0 days.

(21) Appl. No.: 17/830,307

(22) Filed: Jun. 1, 2022

(65) Prior Publication Data
US 2023/0017236 A1    Jan. 19, 2023

Related U.S. Application Data

(60) Provisional application No. 63/222,127, filed on Jul. 15, 2021.

(51) Int. Cl.
| | | |
|---|---|---|
| *A47J 42/50* | (2006.01) | |
| *A23F 5/08* | (2006.01) | |
| *A47J 31/42* | (2006.01) | |
| *A47J 42/40* | (2006.01) | |
| *G01G 11/08* | (2006.01) | |
| *G01G 13/28* | (2006.01) | |

(52) U.S. Cl.
CPC ............... *A47J 42/50* (2013.01); *A23F 5/08* (2013.01); *A47J 31/42* (2013.01); *G01G 13/28* (2013.01)

(58) Field of Classification Search
CPC .. A47J 42/50; A47J 31/42; A47J 42/40; A23F 5/08; G01G 11/086
See application file for complete search history.

(56) References Cited

U.S. PATENT DOCUMENTS

2022/0104660 A1* 4/2022 Almagor ................... A23F 5/08

FOREIGN PATENT DOCUMENTS

CN         112120534 A  * 12/2020

OTHER PUBLICATIONS

English translate (CN112120534A), retrieved date Jul. 14, 2023.*

* cited by examiner

*Primary Examiner* — Matthew Katcoff
*Assistant Examiner* — Mohammed S. Alawadi
(74) *Attorney, Agent, or Firm* — Merle W Richman

(57) ABSTRACT

Embodiments of improved systems including and methods for dosing or processing a desired quantity or dose of particles from a storage container by determining the weight of the storage container and processing mechanism as particles are processed. Other embodiments may be described and claimed.

20 Claims, 5 Drawing Sheets

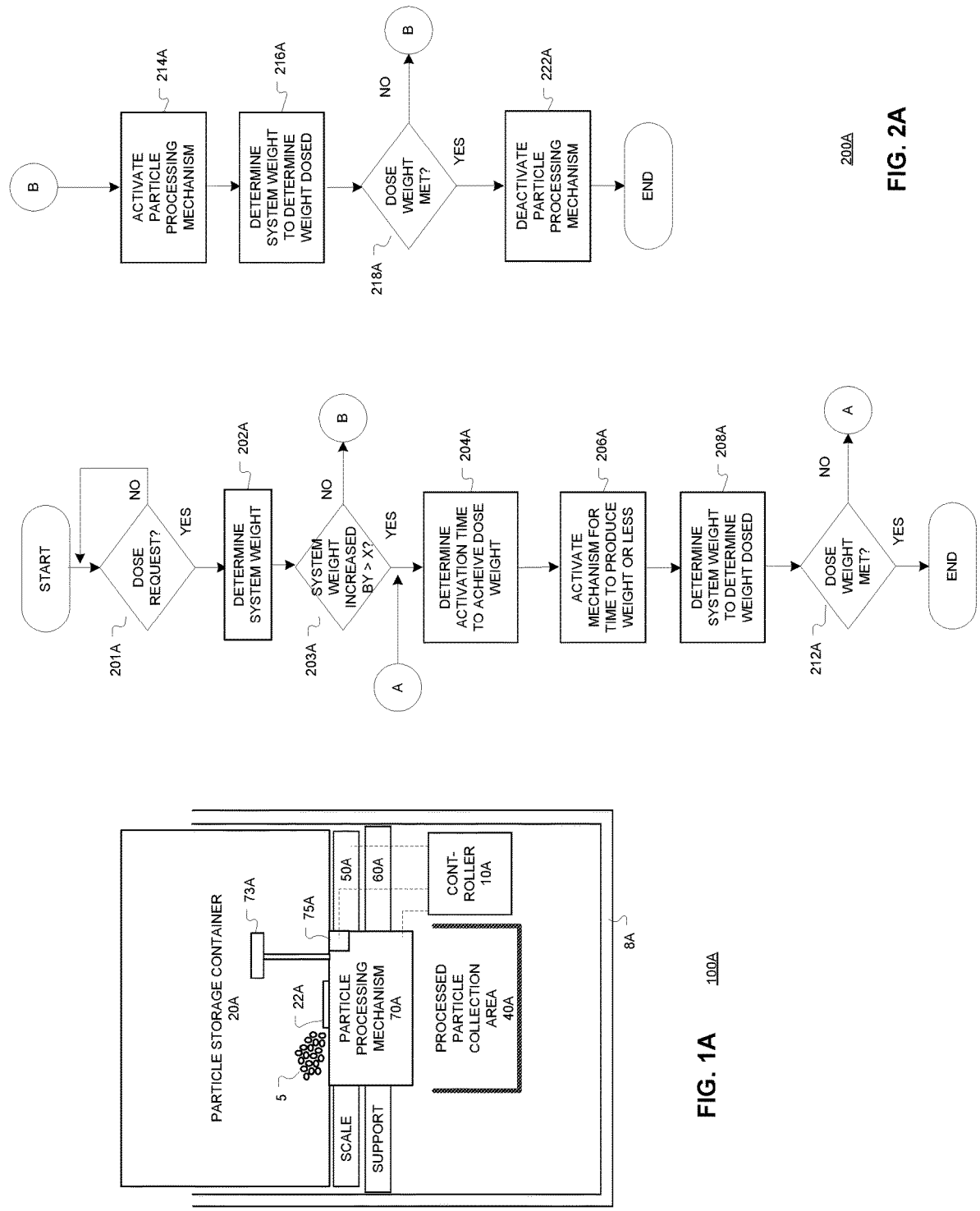

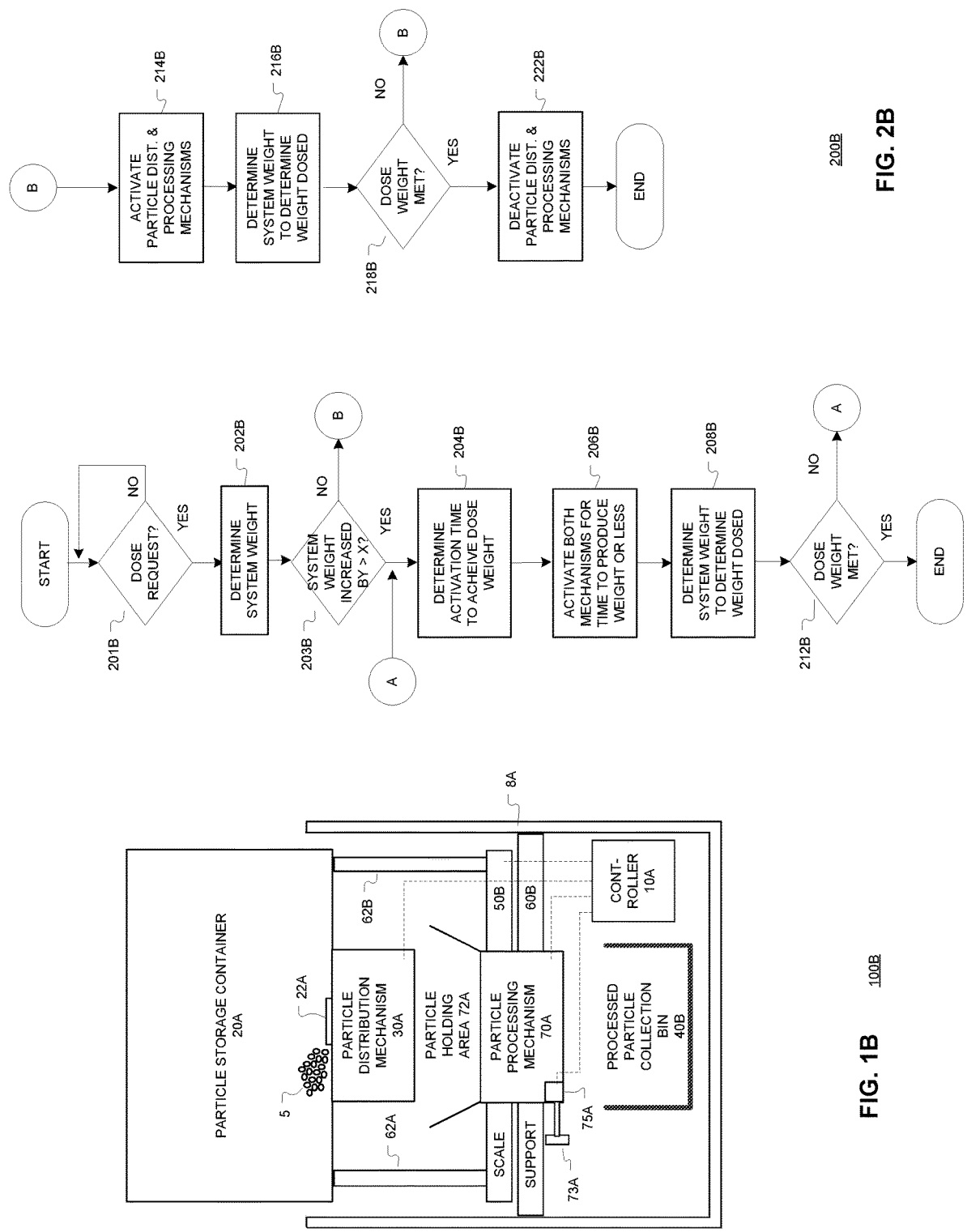

AUTOMATED METHOD AND SYSTEM FOR PROCESSING A DESIRED DOSE OF PARTICLES FROM A PARTICLE STORAGE CONTAINER

TECHNICAL FIELD

Various embodiments described herein relate generally to automated methods and systems for processing a desired quantity or dose of particles from a storage container.

BACKGROUND INFORMATION

It may be desirable to provide automated systems and methods for processing a desired quantity or dose of particles from a storage container; the present invention provides such systems and methods.

BRIEF DESCRIPTION OF THE DRAWINGS

FIG. 1A is a simplified diagram of an automated system that improves the processing of a desired quantity or dose of particles from a storage container according to various embodiments.

FIG. 1B is a simplified diagram of an automated system that improves the processing of a desired quantity or dose of particles from a storage container to a particle processing mechanism via a particle distribution mechanism according to various embodiments.

FIG. 2A is a diagram of an algorithm for processing a desired quantity or dose of particles from a storage container according to various embodiments.

FIG. 2B is a diagram of an algorithm for processing a desired quantity or dose of particles from a storage container to a particle processing mechanism via a particle distribution mechanism according to various embodiments.

DETAILED DESCRIPTION

In an automatic system that includes a particle storage container coupled to a particular processing mechanism directly or via a particle distribution mechanism that distributes particles from the storage container, it is desirable to process a known quantity or amount of the particles. The quantities of particles 5 may be a volume or weight of the particles 5. In an embodiment, the desired processed quantity is based on the weight of processed particles from a storage container. In an embodiment, the desired particle 5 weight (termed dose) may vary as a function of the next use of the particles 5. In an embodiment, the storage container ideally may hold many doses of particles, about 5 to 200 doses in an embodiment.

In an embodiment, the particles may be coffee beans (roasted or green) and the storage container (termed a hopper in an embodiment) may hold the coffee beans. To create a brewed espresso weighting about 20-350 g (grams), 7 to 16 grams of coffee beans may be ideally consumed-used. For regular coffee, however a different quantity of coffee beans may be ideally consumed-used. Accordingly, in an automated system and method for processing particles (such as coffee beans) from a storage container (such as coffee bean hopper), the desired dose (weight) of particles in a dose (coffee beans) may vary as a function of the next usage of the particles (to produce an espresso, cup of coffee, for example).

Figure 1D:
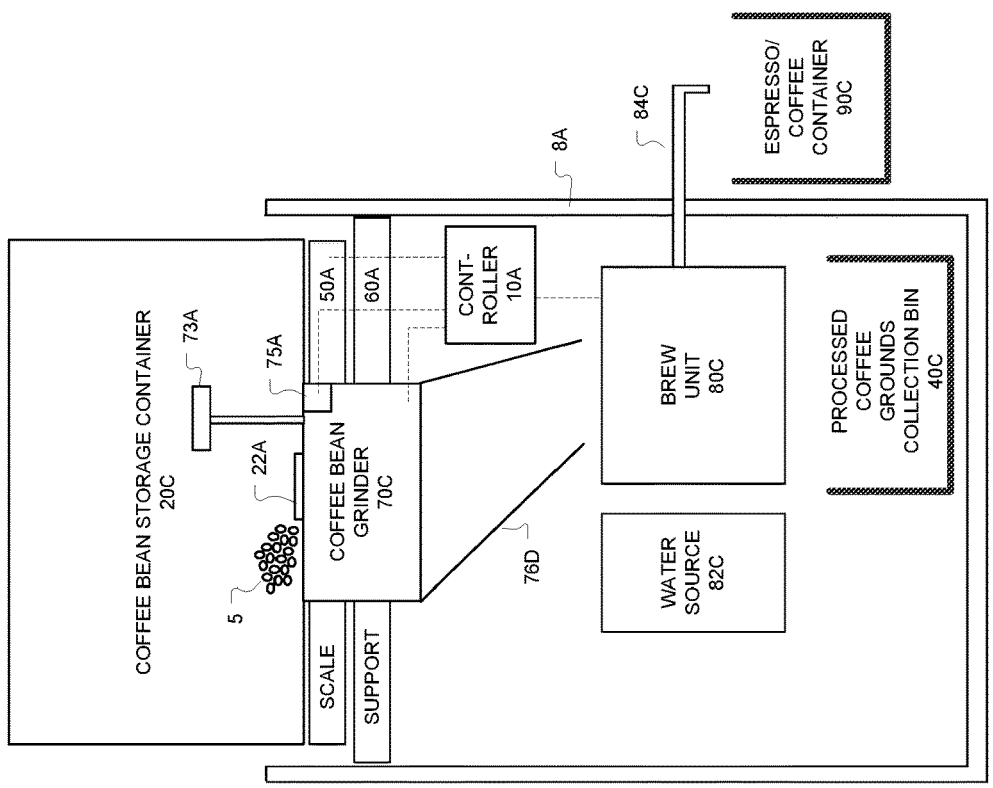
FIG. 1D is a simplified diagram of an automated system that improves the production of coffee via the processing of a desired dose of coffee beans from a storage container via a coffee bean grinder for use by a brew unit via a second chute according to various embodiments.
Figure 1C:
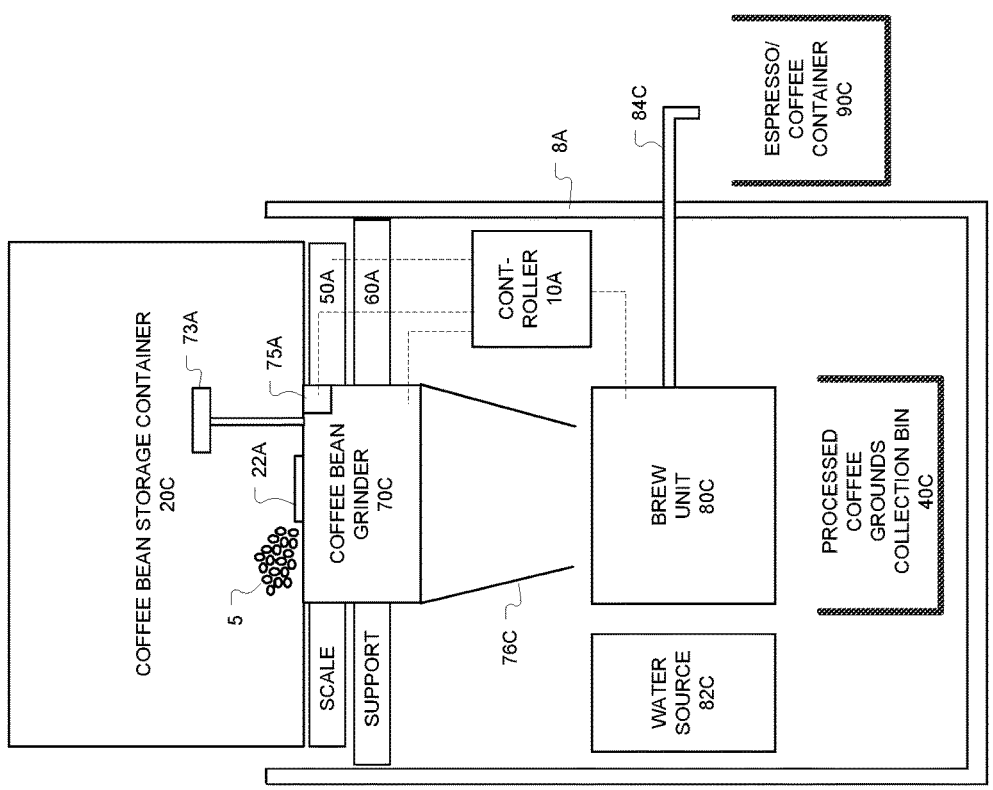
FIG. 1C is a simplified diagram of an automated system that improves the production of coffee via the processing of a desired dose of coffee beans from a storage container via a coffee bean grinder for use by a brew unit via a first chute according to various embodiments.

FIG. 1A is a simplified diagram of an automated system 100A that improves the processing of a desired quantity or dose of particles 5 from a storage 20A container according to various embodiments. As shown in FIG. 1A, the system 100A may include a particle storage container 20A, particle processing mechanism 70A, scale or weighting mechanism/module 50A, support 60A, a particle collection bin 40A, the wall 8A, and a controller 10A. In an embodiment, the particle storage container (PSC) 20A may communicate particles 5 via an opening 22A to the particle processing mechanism (PPM) 70A. In an embodiment, the PSC 20A and PPM 70A may be coupled to the scale or weight module 50A so the weight module 50A can determine the weight of the combination of the PSC 20A, PPM 70A, and any particles 5 therein. The weight module 50A may be coupled to the support 60A. The particle collection bin 40A is not directly coupled the PSC 20A or PPM 70A. As shown in FIGS. 1A-C, the support 60A may be coupled to a wall 8A or main section of the system 100A-C while the PSC 20A/PPM 70A combination is effectively floating via the scale 50A from the wall or main section 8A.

A controller 10A may be coupled to the scale or weight module 50A and receive either an analog or digital signal that indicates the weight of the combination of the PSC 20A, PPM 70A, and any particles 5 therein. The controller 10A may also know/store the weight of the combination of the PSC 20A, PPM 70A alone (no particles)—i.e., the tare weight. Based on the tare weight, the controller 10A may be able to determine the current weight of any particles 5 in the combination of PSC 20A, PPM 70A based on the weight module signal 50A at any time.

In an embodiment, the combination of the PSC 20A and PPM 70A may have a tare weight of about 100 to 2000 grams and be able to store from 100 to 1000 grams of particles 5. The weight module 50A may be able to affect or provide a signal indicating weights from 10 to 3000 grams with an accuracy of 0.1 to 2.0 grams in an embodiment. In an embodiment, the weight module 50A may include a load cell, strain gauge, or other devices capable of providing the required degree of accuracy as a function of the particle 5 weight and dose weight.

The controller 10A may also be coupled to the PPM 70A to control and vary the processing rate of particles 5 such as 1 to 50 particles for a predetermined time interval (such as per second . . . ) if so desired in an embodiment. For example, in an embodiment, the PPM 70A may include a motor coupled to a processing device such as blades, burrs or other particle processing device to process particles for various uses including by another device.

In operation, controller 10A may employ the algorithm 200A shown in FIG. 2A to direct the operation of the PPM 70A to process and produce a desired weight (dose) of particles 5 for various uses including into a particle collection bin 40A when a dose of certain weight of particles 5 is requested (activity 201A). In an embodiment, a User via an input device 272 (FIG. 3) or a User device communicating with the controller 10A via an interface 244 (FIG. 3) may request an operation that processes or requires the processing of a certain weight of particles 5 from the PSC/PPM combination such as 7 to 16 grams of processed particles (coffee beans) to produce a beverage of 20 to 350 grams.

In an embodiment, activities 214A-222A alone may be performed when a dose is requested (activity 201A) via the controller 10A. The controller 10A may activate the particle processing mechanism (PPM) 70A (activity 214A) to process particles 5 located in the PSC 20A. The controller 10A may also communicate with the scale 50A to determine the current system weight. Based on the differential between the system's (PSC/PPM) starting weight and current weight, the controller 10A may determine that a certain weight of particles 5 has been processed by the PPM 70A and passed into the collection area 40A (activity 216A). Once the desired dose weight is met (measured—activity 218A), the controller 10A may deactivate the PPM (activity 222A). In an embodiment, the controller 10A via the known tare weight of the PSC/PPM may also be able to determine the weight of particles 5 stored in the PSC 20A and report same to a User and prevent operation of the PPM 70A when the particle 5 weight is less than a requested dose.

In an embodiment, the controller 10A may employ algorithm 200D periodically or when a dose is requested to determine the weight of particles 5 currently in the system (activities 202D, 203D) based on the system's known tare weight (with no particles 5). When the determined particle 5 weight is less than a first predetermined level (Y1) but sufficient to generate a dose (Y2) (activities 204D, 206D), an alert that the particle 5 level in the system is low may be provided to a User via a display 268 of architecture 200A-C or message communicated to a User device via a modem/transceiver 244 (activity 208D). When the determined particle 5 weight is less than the weight needed to produce/generate a dose (Y2), an alert that the particle 5 level in the system is too low to produce a dose may be provided to a User via a display 268 of architecture 200A-C or message communicated to a User device via a modem/transceiver 244 (activity 212D). In an embodiment, Y1 may be a multiple of Y2, i.e., a predetermined number of dose weight (or average dose weight) including 2 to 10 doses in an embodiment.

In an embodiment, the controller 10A may store the current PSC/PPM (with particles 5) weight. In an embodiment, when the current system PSC/PPM (with particles 5) weight increases such as by a User adding particles 5 to the PSC 20A by a certain amount X (activity 203A) or where the PPM 70A operation affects the ability of the scale 50A to accurately determine the weight of the PSC/PPM (with particles 5), then the controller 10A may employ activities 204A-212A to process a desired dose of particles 5. In an embodiment, X may be two or more dose levels. In an embodiment, the controller 10A may also be able to receive an indication from the PPM 70A of its cycles performed.

In an embodiment based on the requested dose, the controller 10A may determine the activation time for the PPM 70A to achieve the requested dose weight (activity 204A). The activation time may be based on preprogrammed ratios of time to process particles by the PPM 70A to achieve the desired dose. Such ratios may be based on calibration of the PPM for certain particles 5 (such as different types of coffee beans). The User may be able to specify the particles 5 type in the PSC 20A so the activation time may be adjusted accordingly. In addition, the controller 10A via another device such as an optical sensor may be able to determine attributes of the particles 5 stored in the system (PSC 20A and PPM 70A).

In an embodiment, a User may also be able to set attributes of the PPM 70A that affect how the particles 5 are processed (such as via adjustment knob 73A) and the controller 10A may be able to detect the current attribute setting of the PPM 70A via a sensing module 75A. For example, the PPM 70A may be a grinder, the adjustment knob 73A may set its particle grind size setting (from coarse to fine for example), and the sensing module 75A may be able to communicate the grinder size setting to the controller 10A. Based on the grind size setting, the activation time may be increased (for finer grind) or reduced (for coarser grind) in an embodiment. In an embodiment, the sensing module 75A may be a potentiometer that is coupled to the control knob 73A to provide a signal to the controller 10A indicating the control knob 73A state.

In an embodiment, the activation time for the PPM 70A may be selected to provide slightly less than the desired weight or dose to prevent over distribution of particles 5 (activity 204A). For example, where 14 grams of particles are desired (dose weight of 14 grams), the PDM 30A may be activated to process a certain percentage less (from 5 to 20% less) (activity 206A) and then weight the system—PSC/PPM-particles 5 remaining combination to determine the weight differential and thus dose weight (activity 208A) thus far. In particular, based on the combined weight of the PSC/PPM-particles 5 prior to PPM 70A activation (206A), and current weight, the dose of particles 5 distributed may be determined. When the dose weight is within a tolerance (within the weight mechanism accuracy) or a percentage of the dose weight in an embodiment (0.5 to 5% in an embodiment), the distribution process may be complete (activity 212A).

For example, where the desired dose weight is 14 g, the desired accuracy may be 0.2 g or about one particle (coffee bean). Otherwise, the differential between the required weight or dose and that has been processed thus far may be determined and used to determine a differential dose to be processed using algorithm activities 204A-212A until the desired total dose is processed within tolerance. Such a process (versus activities 214A-222A) may eliminate weighting errors versus continuously weighting the combination of PSC/PPM-remaining particles 5 while the PPM 70A is actively processing particles 5. Such a process (activities 204A-212A) may also enable particles 5 and processed particles to move about the system PSC/PPM. For example, ground coffee may adhere to the PPM 70A or chutes (76C, 76D, FIGS. 1C-1D).

FIG. 1B is a simplified diagram of another automated system 100B that improves the processing of a desired quantity or dose of particles 5 from a storage container 22A to a collection bin 40B via a particle distribution mechanism 30A (PDM) and a particle processing mechanism 70A according to various embodiments. As shown in FIG. 1B, the system 100B further includes a particle distribution mechanism 30A (PDM), and a particle holding area 72A. As shown in FIG. 1B, the PSC 20A and PDM 30A may be coupled to the scale 50B via supports 62B. Similar to system 100A, the PPM 70A may also be coupled to the scale 50B where the scale 50B coupled to a support 60B. In an embodiment the PDM 30A may be include various types of particle movement mechanisms including a rotating window, auger, or other mechanisms. The PDM 30A may be activated by the controller 10A and may cause particles 5 in the PSC 20A to transit to the particle holding area 72A. In an embodiment, the particle holding area 72A may be part of the PPM 70A.

In an embodiment, the controller 10A communicates with the PDM 30A, weight module 50A, sensing module 75A, and the PPM 70A. Controller 10A may employ the algorithm 200B shown in FIG. 2B to process particle dosing requests in system 100B. Algorithm 200B is similar to algorithm 200A other than the additional activation of the PDM 30A to move particles 5 to the PPM 70A for processing. In an embodiment, the controller 10A may activate the PDM 30A at the same time as the PPM 70A and keep both operating until the desired dose weight is achieved (activity 212B, 218B). In another embodiment, the controller 10A may activate the PDM 30A first, for a time interval, loading the holding area 72A or at least partially loading the holding area 72A prior to activating the PPM 70A as function of particle consumption speed of the PPM 70A versus the particle distribution speed of the PDM 30A. The weight of the system 100B may include the PSC 20A, PDM 30A, holding area 72A, PPM 70A and any particles 5 in the PSC 20A and holding area 72A.

FIG. 1C is a simplified diagram of an automated system 100C that improves the production of espresso-coffee via the initial processing of a desired dose of coffee beans 5 from a storage container 20C via a coffee bean grinder 70C for use by a brew unit 80C according to various embodiments. As shown in FIG. 1C, the system 100C includes a PSC 20C, scale—weight mechanism 50A, support 60A, controller 10A, coffee bean grinder 70C, processed particle chute 76C, brew unit 80C, water source 82, processed coffee grounds collection bin 40C, brew unit spout 84C, and espresso-coffee container 90C. In the embodiments 100A and 100C, the PSC 20A may have an opening 22A that enables particles 5 to pass to the PPM 70A for processing when activated by a controller 10A. In an embodiment, the controller 10A may employ the algorithm 200C shown in FIG. 2C to generate coffee or expresso for collection by the coffee container 90C at the direction of a User via a system input device 272 or User device communicating the controller 10A via a modem-transceiver 244 (FIG. 3).

Figure 2C:
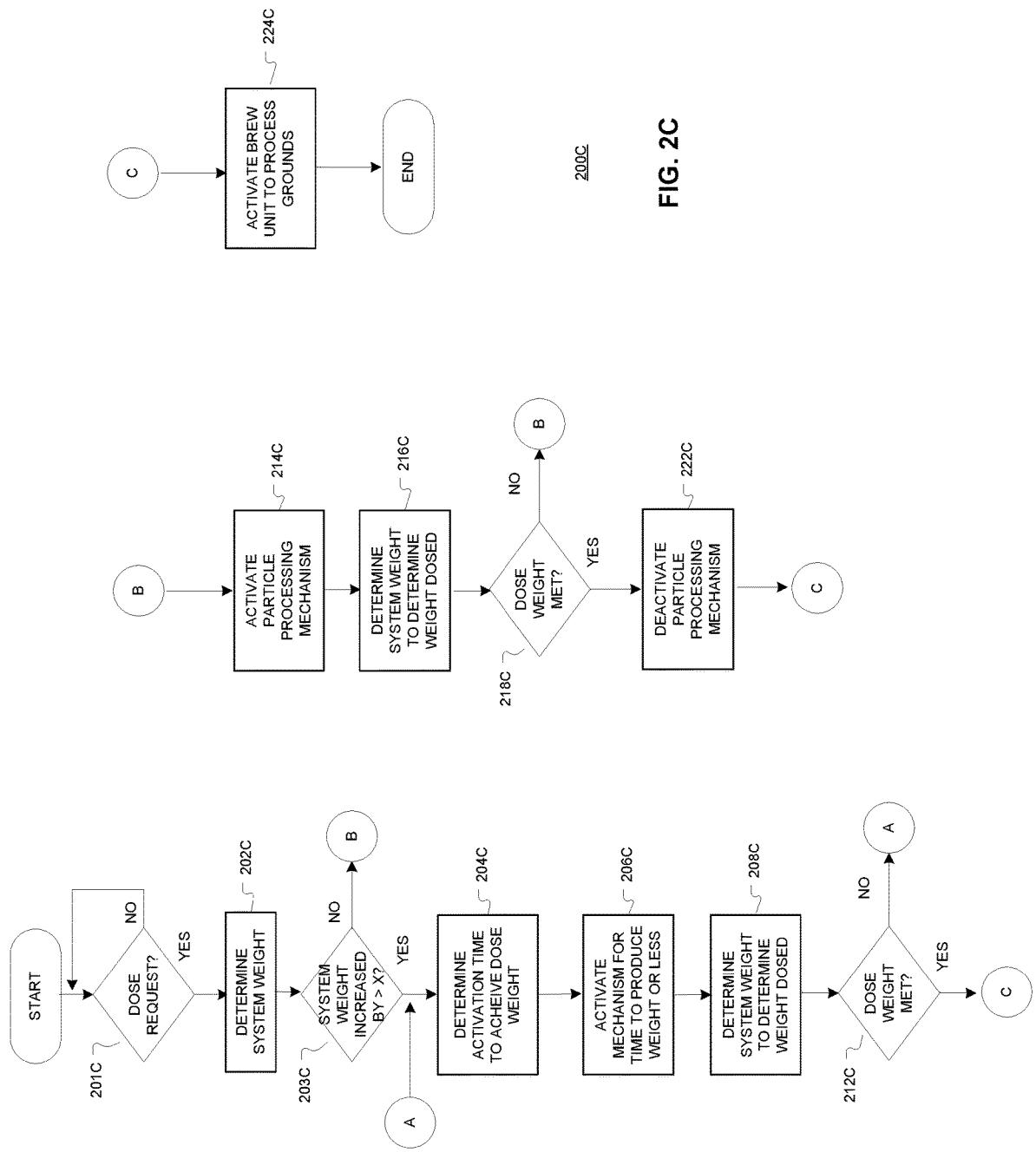
FIG. 2C is a diagram of an algorithm for production of coffee/espresso via the processing of a desired dose of coffee beans from a storage container via a coffee bean grinder for use by a brew unit according to various embodiments.

Algorithm 200C shown in FIG. 2C is similar to the algorithm 200B other than the additional activity of the controller 10A activating the brew unit 80C (activity 224C), after the PPM 70A has processed the desire dose of coffee beans (produced the desired weight of coffee grounds). As shown in FIG. 1C, a processed particle chute 76C may direct the processed particles (coffee grounds) to a brew unit 80C. FIG. 1D shows another processed particle chute 76D. In an embodiment, the chutes 76C, 76D ideally enable grounds to move via gravity to the brew unit for processing. Processed particles that remain in a chute 76C, 76D due to geometry or clumping, may remain part of the measured system weight until they exit the chute 76C, 76D completely in an embodiment. In an embodiment, the chute 76C, 76D walls have at least a 45-degree angle relative to the next processing unit.

Figure 3:
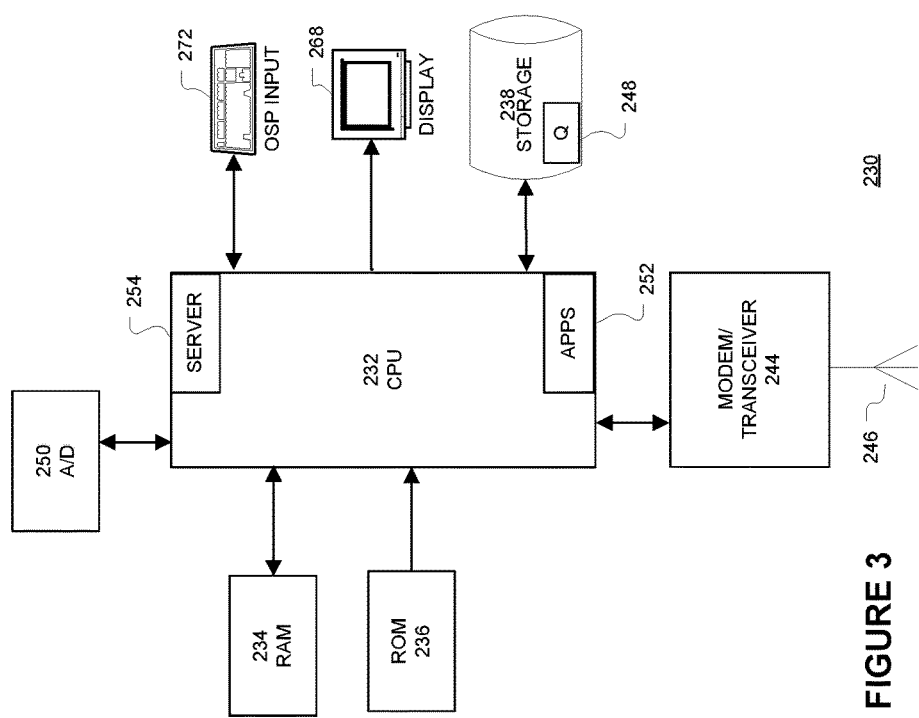
FIG. 3 is a block diagram of an article according to various embodiments.
Figure 2D:
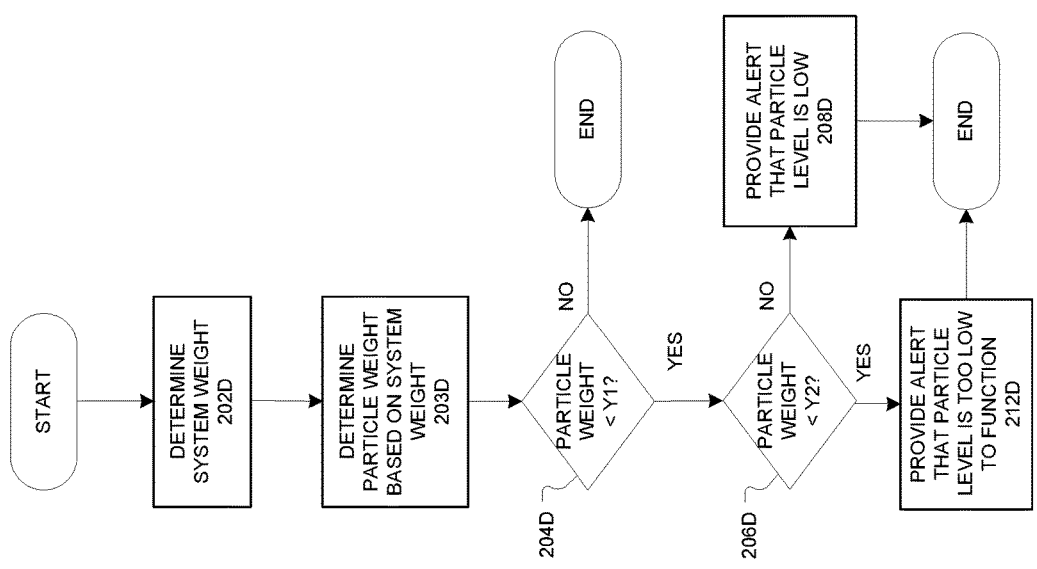
FIG. 2D is a diagram of an algorithm for alerting about the level of particles in a storage container according to various embodiments.

FIG. 3 illustrates a block diagram of a device 230 that may be employed as a controller 10A in various embodiments to perform the algorithms 200A-C and communicate with a User device. The device 230 may include a CPU 232, a RAM 234, a ROM 236, a storage unit 238, a modem/transceiver 244, a digital to analog converter 250, an input module 272, display module 268, and an antenna 246. The CPU 232 may include a web-server 254 and application module 252. The RAM 234 may include a queue or database where the database may be used to store information including particle data, requests for distributions, and user information such as desired doses for various particle usage. The storage 238 may also include a queue or database 248 where the database 248 may be used to store particle distribution requests and related processing requests in an embodiment. In an embodiment, the server 254 and the application module 252 may be separate elements. In an embodiment, the server 254 may generate content for web-pages or displays to be forwarded to a user to control the operation of a system 100A-D.

The user input device 272 may comprise an input device such as a keypad, touch screen, track ball or other similar input device that allows the user to navigate through menus, displays in order to operate systems 100A-D. The display 268 may be an output device such as a CRT, LCD, touch screen, or other similar screen display that enables the user to read, view, or hear received messages, displays, or pages from the system 100A-D.

The modem/transceiver 244 may couple, in a well-known manner, the device 230 to a user device to enable communication with the CPU 232. In an embodiment, the modem/transceiver 244 may be a wireless modem or other communication device that may enable communication with a user device. The CPU 232 via the server 254 or application 252 resident on a user device may direct communication between modem 244 and a User device such as a User's cellphone, smart watch, tablet, computer, or other electronic device having wireless communication capability.

The ROM 236 may store program instructions to be executed by the CPU 232, server 254, or application module 252. The RAM 234 may be used to store temporary program information, queues, databases, and overhead information. The storage device 238 may comprise any convenient form of data storage and may be used to store temporary program information, queues, databases, and overhead information.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus, the following claims are hereby incorporated into the Detailed Description, with each claim standing on its own as a separate embodiment.

What is claimed is:

1. A system for processing a desired quantity of particles for further processing, the system including:
   a storage container capable of storing a plurality of the desired quantity of particles;
   a particle grinder coupled one of directly or indirectly to the storage container for processing particles, the processed particles exiting the particle grinder once processed;
   wherein the storage container communicates the particles to the particle grinder via an opening therebetween;
   a weighting module operatively coupled the storage container and the particle grinder and able to weight the storage container and the particle grinder and the particles located therein; and
   a controller operatively coupled to the weighting module and the particle grinder,
   wherein the controller directs the particle grinder to process particles until change in weight indicated by the weighting module equals the desired quantity of particles.

2. The system for processing the desired quantity of particles for further processing according to claim 1, wherein the controller provides an indication of the overall weight of particles in the storage container and particle grinder based on the known empty weight of the storage container and particle processor mechanism.

3. The system for processing the desired quantity of particles for further processing according to claim 1, wherein the particle grinder is coupled directly to the storage container.

4. The system for processing the desired quantity of particles for further processing according to claim 1, wherein the particles are coffee beans and the particle grinder is a coffee bean grinder.

5. The system for processing the desired quantity of particles for further processing according to claim 1, wherein an attribute of the particle grinder is configurable and the system further including a sensing system capable of detecting the configured attribute of the particle grinder.

6. The system for processing the desired quantity of particles for further processing according to claim 1, wherein the controller receives an indication of the configured attribute of the particle grinder from the sensing system.

7. The system for processing the desired quantity of particles for further processing according to claim 6, wherein the particles are coffee beans and the particle processing mechanism is a coffee bind grinder and the configurable attribute is the grind setting.

8. The system for processing the desired quantity of particles for further processing according to claim 7, wherein the system is part of a coffee generation system.

9. The system for processing the desired quantity of particles for further processing according to claim 7, wherein the system further includes a brew unit and the coffee beans processed by the particle grinder are directed to brew unit.

10. The system for processing the desired quantity of particles for further processing according to claim 1, wherein the weighting module includes a load cell.

11. The system for processing the desired quantity of particles for further processing according to claim 1, wherein the particles are coffee beans and the particle grinder is a coffee bean grinder and the desired quantity of coffee beans may vary by a factor of 3.

12. A method for processing a desired quantity of particles for further processing, the method including:
    determining the combined weight of a storage container, a particle grinder, and particles located therein, the storage container capable of storing a plurality of the desired quantity of particles, the particle grinder coupled one of directly or indirectly to the storage container for processing particles; and
    wherein the storage container communicates the particles to the particle grinder via an opening therebetween
    directing the particle grinder to process particles until the change in determined weight equals the desired quantity of particles.

13. The method for processing the desired quantity of particles for further processing according to claim 12, further including providing an indication of the overall weight of particles in the storage container and the particle grinder mechanism based on the known empty weight of the storage container and the particle grinder.

14. The method for processing the desired quantity of particles for further processing according to claim 12, wherein the particle grinder is coupled directly to the storage container.

15. The method for processing the desired quantity of particles for further processing according to claim 12, wherein the particles are coffee beans and the particle grinder is a coffee bean grinder.

16. The method for processing the desired quantity of particles for further processing according to claim 12, wherein an attribute of the particle grinder is configurable and including detecting the configured attribute of the particle grinder.

17. The method for processing the desired quantity of particles for further processing according to claim 16, wherein the particles are coffee beans and the particle grinder is a coffee bean grinder and the configurable attribute is the grind setting.

18. The method for processing the desired quantity of particles for further processing according to claim 12, employing a load cell to determine the combined weight of a storage container, the particle grinder, and particles located therein.

19. The method for processing the desired quantity of particles for further processing according to claim 1, wherein the particles are coffee beans and the particle grinder is a coffee bean grinder and the desired quantity of coffee beans may vary by a factor of 3.

20. The method for processing the desired quantity of particles for further processing according to claim 12, further including providing an indication of the overall weight of particles in the storage container and the particle grinder based on the known empty weight of the storage container and the particle grinder.

* * * * *